United States Patent [19]

Thoben et al.

[11] Patent Number: 4,645,909
[45] Date of Patent: Feb. 24, 1987

[54] TOASTER AND OVERHEAD SUPPORT

[75] Inventors: Matthew A. Thoben, Atlanta, Ga.; Earl Clowers, Jackson, Tenn.; Guy Cihi, Atlanta, Ga.; Dean Ball, Gainesville, Ga.; Jack L. McCurdy, Lawrenceville, Ga.; Al S. Rummelsburg, Eastchester, N.Y.

[73] Assignee: Kidde Consumer Durables Corp., Bronx, N.Y.

[21] Appl. No.: 618,962

[22] Filed: Jun. 1, 1984

[51] Int. Cl.[4] .............................................. H05B 1/02
[52] U.S. Cl. .................................. 219/411; 219/385; 219/413
[58] Field of Search ............... 219/405, 411, 398, 385, 219/386, 391, 395, 412, 413, 521, 330, 497, 501, 10.55 B; 374/121; 99/326, 334, 329 R; 312/245, 279; 248/224.4, 224.3

[56] References Cited

U.S. PATENT DOCUMENTS

| | | | |
|---|---|---|---|
| 1,540,628 | 6/1925 | Hurxthal | 99/334 |
| 1,901,603 | 3/1933 | Juengst | 219/391 |
| 2,133,045 | 10/1938 | Rumford | 374/121 |
| 2,595,748 | 5/1952 | Andrews | 219/10.55 B |
| 2,631,523 | 3/1953 | Olving | 99/326 |
| 3,119,001 | 1/1964 | Andrews | 99/329 R |
| 3,266,725 | 8/1966 | Garrison | 219/413 |
| 3,824,916 | 7/1974 | Green | 99/334 |
| 3,845,272 | 10/1974 | Schultz | 219/386 |
| 4,245,148 | 1/1981 | Gisske | 99/329 R |
| 4,313,043 | 1/1982 | White | 312/245 |
| 4,461,941 | 7/1984 | Fukuda | 374/121 |

*Primary Examiner*—E. A. Goldberg
*Assistant Examiner*—Teresa J. Walberg
*Attorney, Agent, or Firm*—Seidel, Gonda, Goldhammer & Abbott

[57] ABSTRACT

A toaster is mountable on a heat reflective overhead support which is adapted to be secured to a supporting surface such as the underside of a cabinet. The support is recessed from the front of the toaster so as to accomodate the lip of the cabinet. The toaster is provided with a shelf or grill which is movable between a first, heating position and a second, delivery position below and forward of the heating position. The grill is lockable in the heating position by a locking mechanism which comprises a releasable latch bar. An infrared (IR) sensor senses IR radiation produced by a food article supported on the grill. The IR sensor is part of an electrical circuit which controls the heater elements as well as an electromechanical element which releases the latch bar. When the latch bar is released, a spring assisted parallelogram linkage transfers the grill by gravity from the heating position to the delivery position. At the same time, the linkage pivots a front door between closed and open positions to provide access to the toasted food article.

5 Claims, 13 Drawing Figures

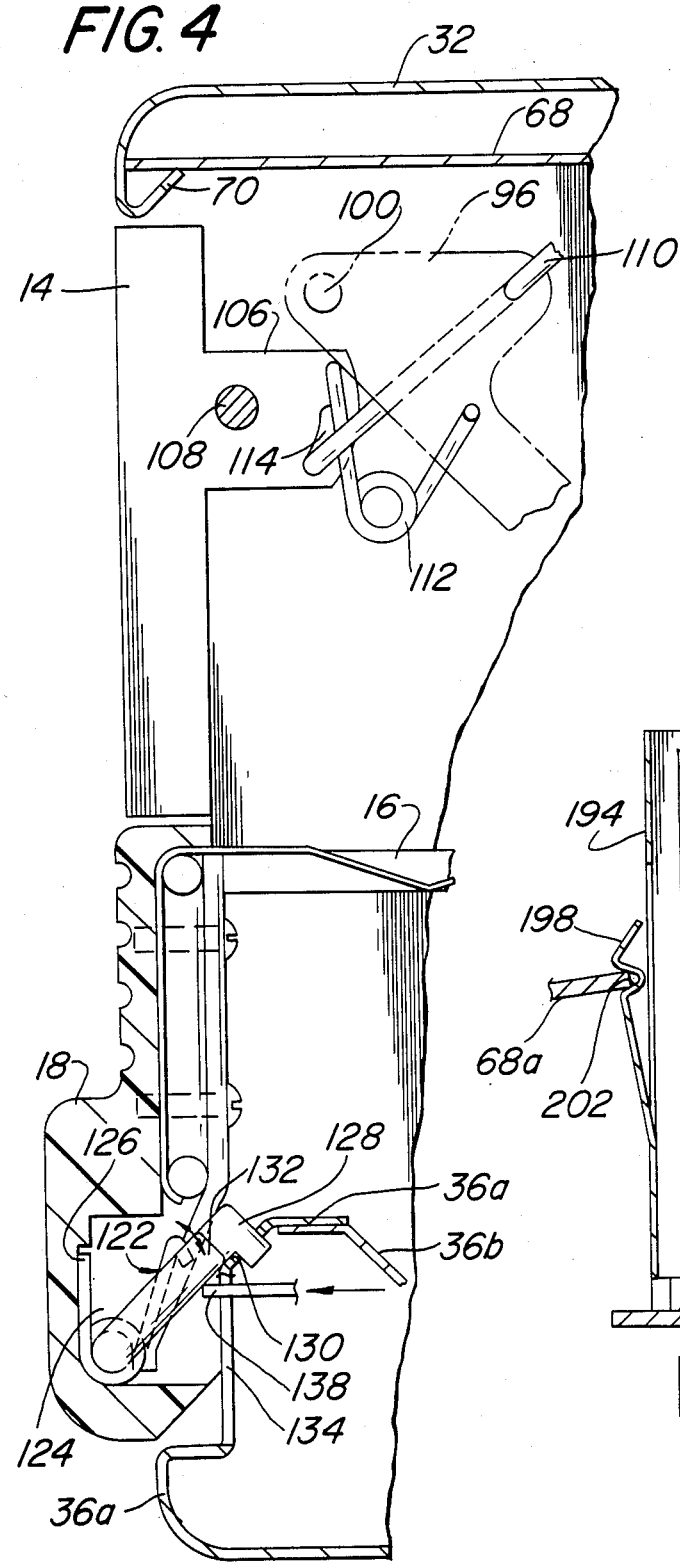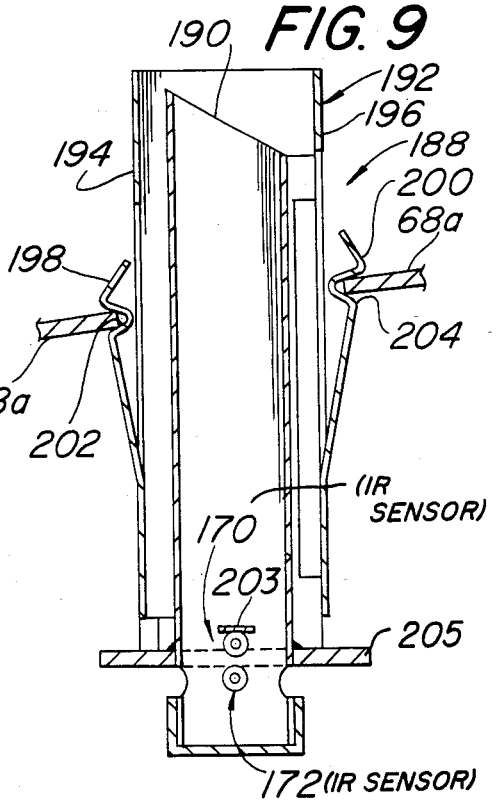

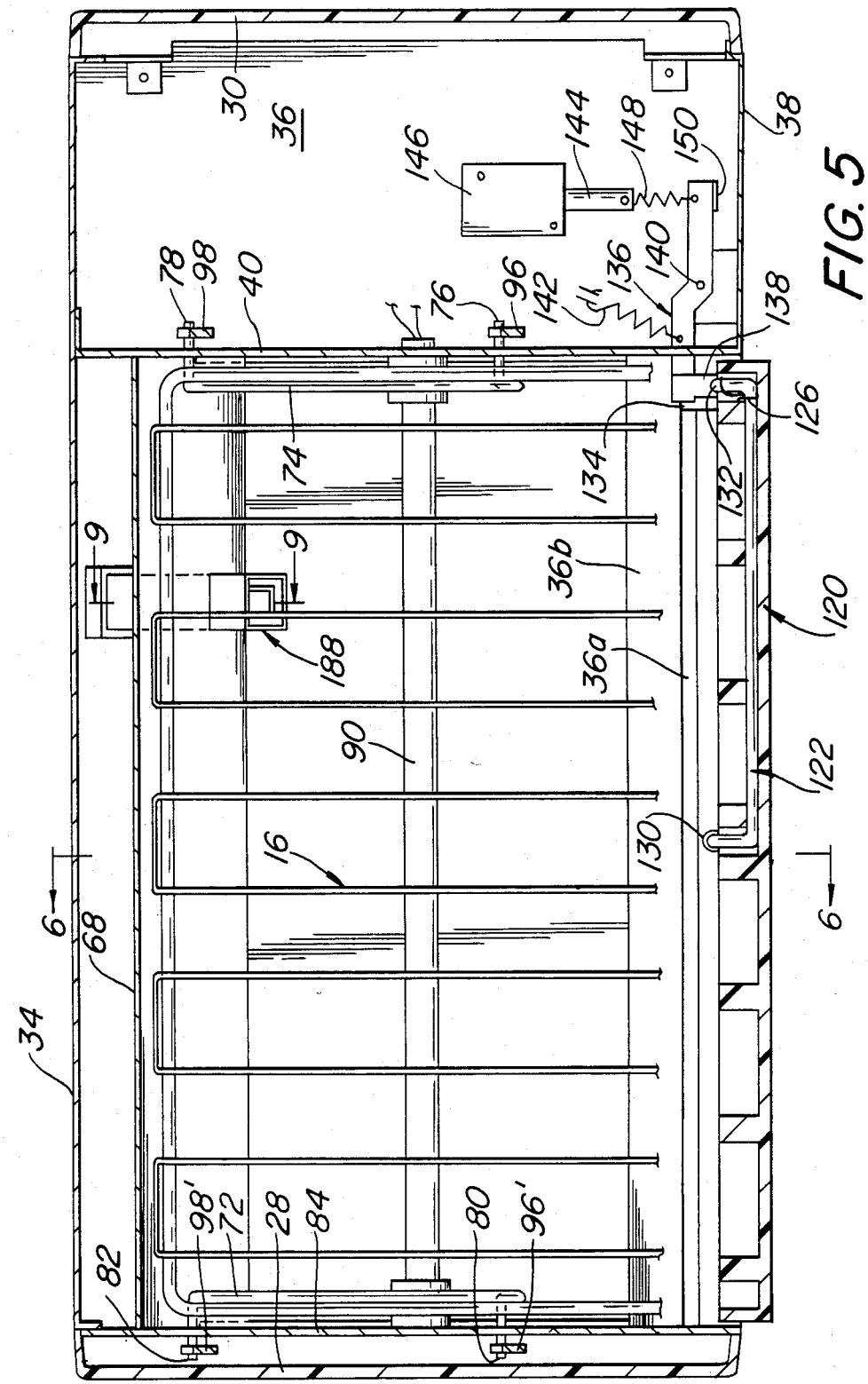

TOASTER AND OVERHEAD SUPPORT

BACKGROUND OF THE INVENTION

The present invention is directed to a toaster having electronically controlled heating elements and a mechanism for moving the toaster shelf or grill between a heating position within the toaster and a delivery position forward and below the heating position. The invention is also directed to an overhead support for mounting the toaster to and below the underside of a cabinet.

A toaster which is adapted to be installed beneath a U.S. Pat. No. 3,464,749. A kitchen counter is disclosed in U.S. Pat. No. 3,464,749. A toaster unit provided with a mounting bracket which may be attached to a surface is illustrated in U.S. De. Pat. No. 266,137. U.S. Pat. No. 3,230,862 discloses a toaster which is mounted on a counter surface.

German patent publication No. 2,224,762 discloses a parallelogram linkage for moving a grill horizontally. Toasters with a generally horizontally movable grill and a pivotable front door are disclosed in U.S. Pat. Nos. 3,693,538 and 3,859,903.

U.S. Pat. Nos. 3,392,663 and 4,296,312 disclose temperature sensors which directly contact a food article. U.S. Pat. No. 4,395,621 discloses the use of a thermistor in a toaster.

It is an object of the present invention to provide a toaster having a linkage mechanism which guides the grill as it moves by gravity between a heating position within the toaster and a delivery position forward and below the heating position.

It is a further object of the invention to provide a pivotable front door which is automatically opened and closed by the linkage mechanism as the grill transfers between the heating and delivery positions.

It is a further object of the invention to provide an electronic control for the heating elements which utilizes an IR sensor.

It is a further object of the invention to provide an electro-mechanical control for releasing the grill so that the grill may transfer from the heating position to the delivery position automatically when the food article has been toasted to the desired degree.

It is a further object of the invention to provide an overhead support mechanism for securing the toaster to and below the underside of a cabinet.

Other objects and advantages of the invention appear hereinafter.

BRIEF SUMMARY OF THE INVENTION

A toaster comprising a frame, a shelf for supporting a food article and mounted on the frame for movement from a first heating position to a second delivery position forward and below the heating position, heater means disposed within the frame for heating a food article, IR sensor means for sensing IR radiation produced by the food article, means for activating the heater means, means coupled to the IR sensor means for de-activating the heater means when the IR radiation produced by the food article exceeds a preselected threshold, and linkage means coupled to the shelf for transferring the shelf from the heating position to the delivery position by gravity. A heat reflective overhead support means is adapted to be secured to a supporting surface such as the underside of a kitchen cabinet, and the toaster frame and overhead support means are provided with mating structure for securing the frame to the overhead support means below the supporting surface.

For the purpose of illustrating the invention, there is shown in the drawings a form which is presently preferred; it being understood, however, that this is not limited to the precise arrangements and instrumentalities shown.

BRIEF DESCRIPTION OF THE DRAWINGS

FIG. 4 is a partial section taken along 4—4 in FIG. 1 showing the coupling between the front door and parallelogram linkage and the releasable locking meahanism for the grill.

FIG. 5 is a plan section taken along 5—5 in FIG. 3 showing the release for the locking mechansim.

FIG. 9 is a section of the IR sensor mounting assembly taken along 9—9 in FIG. 5.

DETAILED DESCRIPTION OF THE INVENTION

Figure 1:
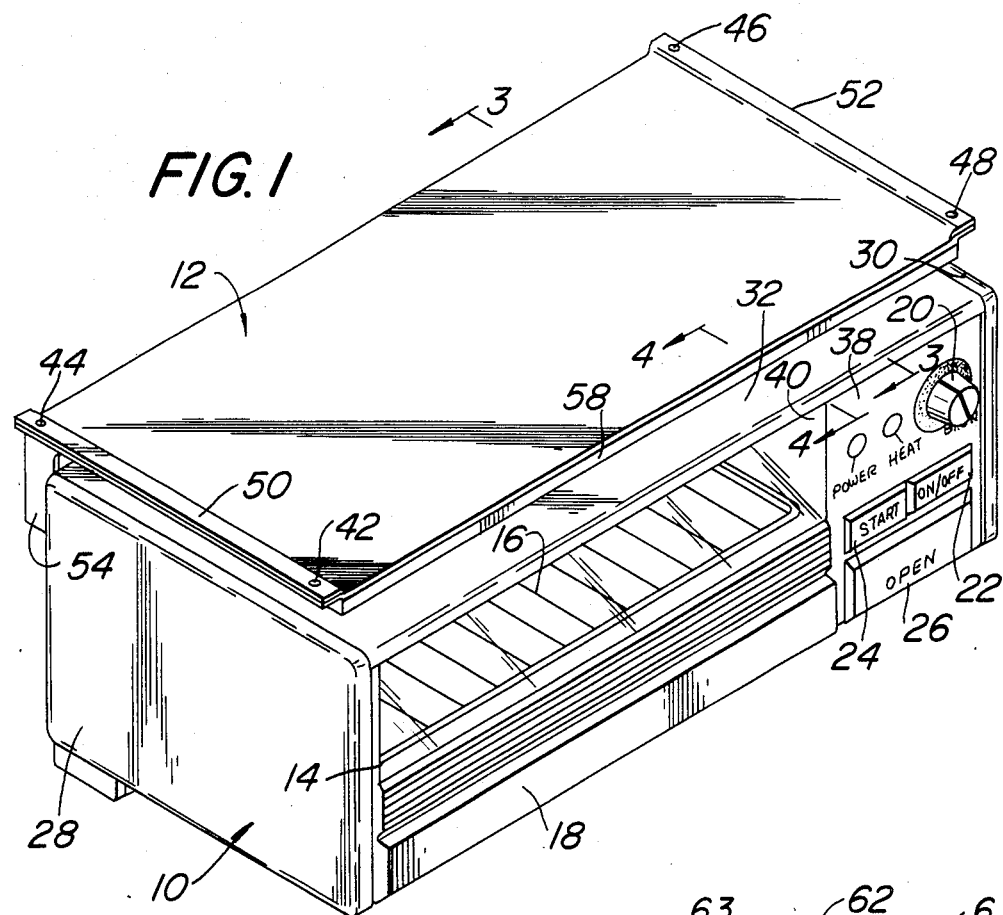
FIG. 1 is a perspective of the toaster and overhead support mechanism of the present invention.

Referring to the drawings, wherein like numerals indicate like elements, there is shown in FIG. 1 the toaster 10 and overhead support mechanism 12 of the present invention. The toaster 10 is provided with a pivotable front door 14. A shelf or grill 16 for supporting a food article such as a slice of bread is located behind the front door. A panel 18, which is secured to the grill, is located below door 14. Preferably, a portion of the panel 18 is cut-out and grooved so as to facilitate handling by the operator. To one side of the door 14 and panel 18, there is located a rotary dial 20 for setting the toaster so as to obtain the desired degree of toasting of the food article on the grill. An "on/off" switch 22 and a "start" switch 24 are located below the dial. A pivotable plate 26 is located below switches 22 and 24 and is marked "open".

The toaster frame includes exterior side walls 28, 30, top wall 32, rear wall 34 (FIG. 2), partial bottom wall 36 and partial front wall 38. Dial 20, "on/off" switch 22, "start" switch 24, and "open" plate 26 are mounted on partial front wall 38. An interior wall 40 extends between the rear wall 34 and partial front wall 38. As shown in FIG. 5, an interior wall 84 extends between the rear wall and the front of the toaster, alongside and inward of side wall 28.

Figure 2:
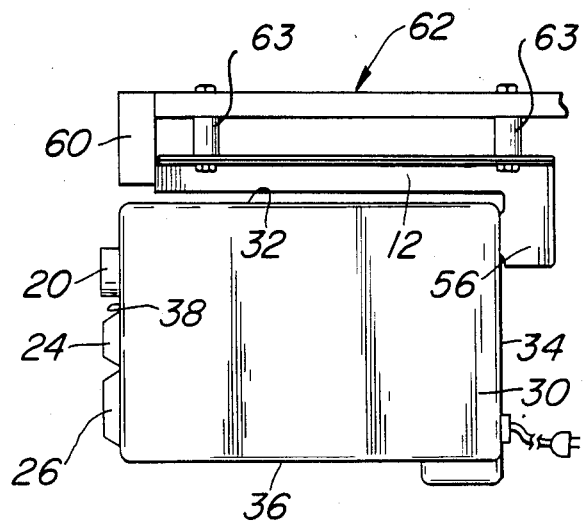
FIG. 2 is a side elevation of the toaster and overhead support mechanism wherein the mechanism is secured to the underside of a cabinet.

As shown in FIGS. 1 and 2, the overhead support mechanism 12 is secured to and below a supporting surface, such as the underside of a cabinet 62, by bolts or the like which extend through heat insulative spacers 63 and holes 42, 44, 46 and 48 formed in side flanges 50, 52. Spacers 63 may be made of a phenolic material. The overhead support mechanism is a unitary structure provided with a pair of bayonet arms 54, 56 which couple with mating structure in the toaster frame to secure the toaster to the overhead support mechanism below the cabinet. The front edge 58 of the overhead support mechanism is recessed with respect to the front of the toaster so as to accomodate the overhanging lip or apron portion 60 of cabinet 62. The overhead support mechanism also serves as a heat shield between the toaster and cabinet and may be made of stainless steel or a chrome plated metallic material so as to provide a heat reflective surface facing the toaster top wall 32.

Figure 3:
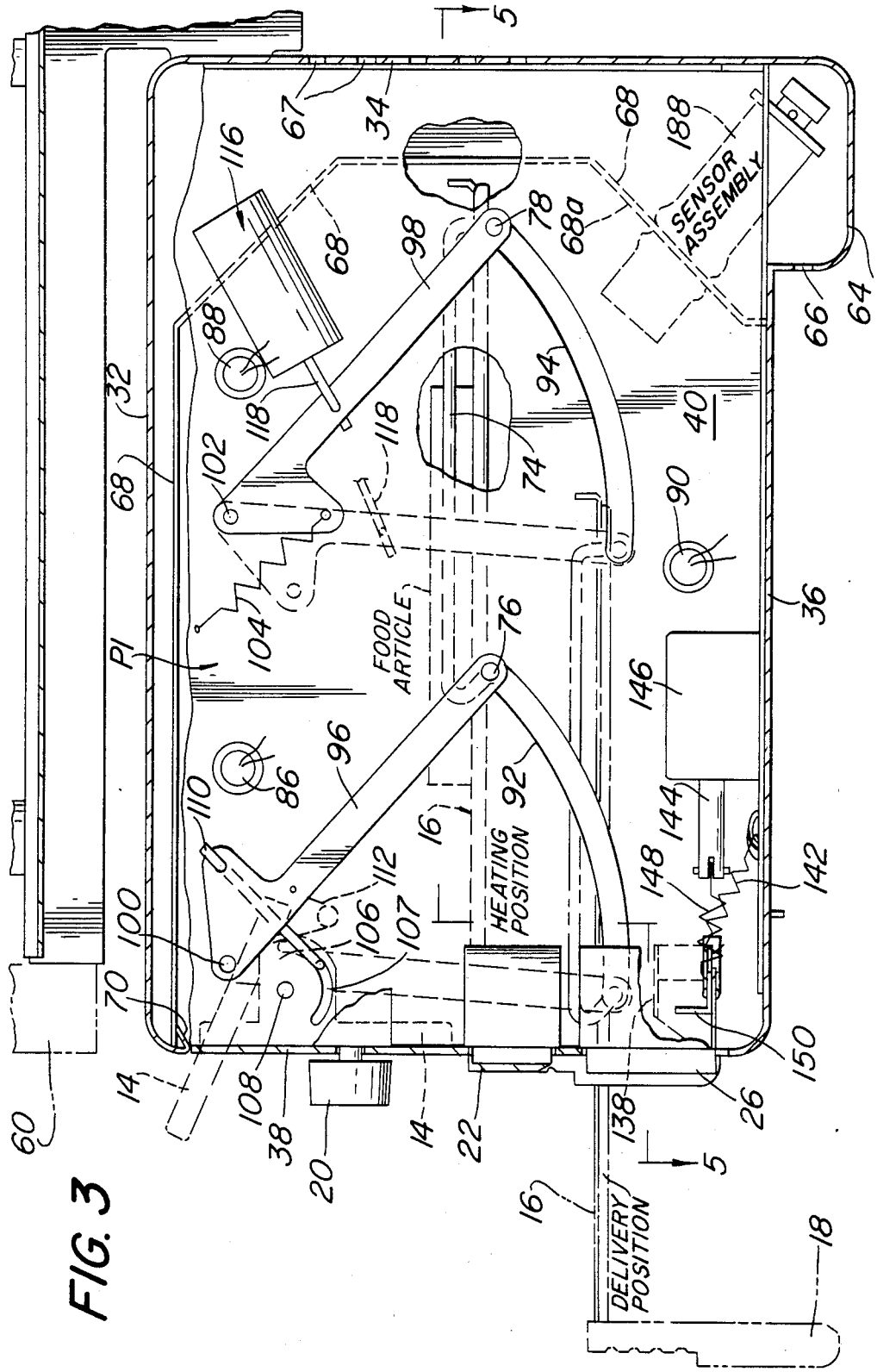
FIG. 3 is a section taken along 3—3 in FIG. 1 showing the parallelogram linkage and the heating and delivery positions of the shelf or grill.

Referring to FIG. 3, it can be seen that the toaster top wall 32 and rear wall 34 are formed from a unitary piece of material such as metal. The rear wall is provided with a lower bight portion 64 which is provided with one or more slots 66 so as to admit ambient air. The major portion of the rear wall is also provided with slots 67. Air flows between slots 66 and 67 across a sensor assembly 188 (described hereafter) so as to cool the toaster interior and prevent the sensor assembly from overheating. As shown in FIG. 5, the partial front wall 38, interior wall 40 and partial bottom wall 36 are formed from a unitary piece of material such as metal and, in conjunction with side wall 30 and top wall 32, define a compartment for a releasable locking mechanism and part of a linkage mechanism (described hereafter). A reflector 68 is mounted within the toaster frame between interior walls 40 and 84 and is supported by a laterally extending flange 70 which is part of the top wall 32. A pair of rod-shaped top heating elements 86, 88 extend between interior walls 40 and 84 above grill 16 and proximal the top portion of reflector 68. A rod-shaped bottom heating element 90, extending in like manner between walls 40 and 84, is disposed below the grill proximal the toaster bottom.

Figure 6:
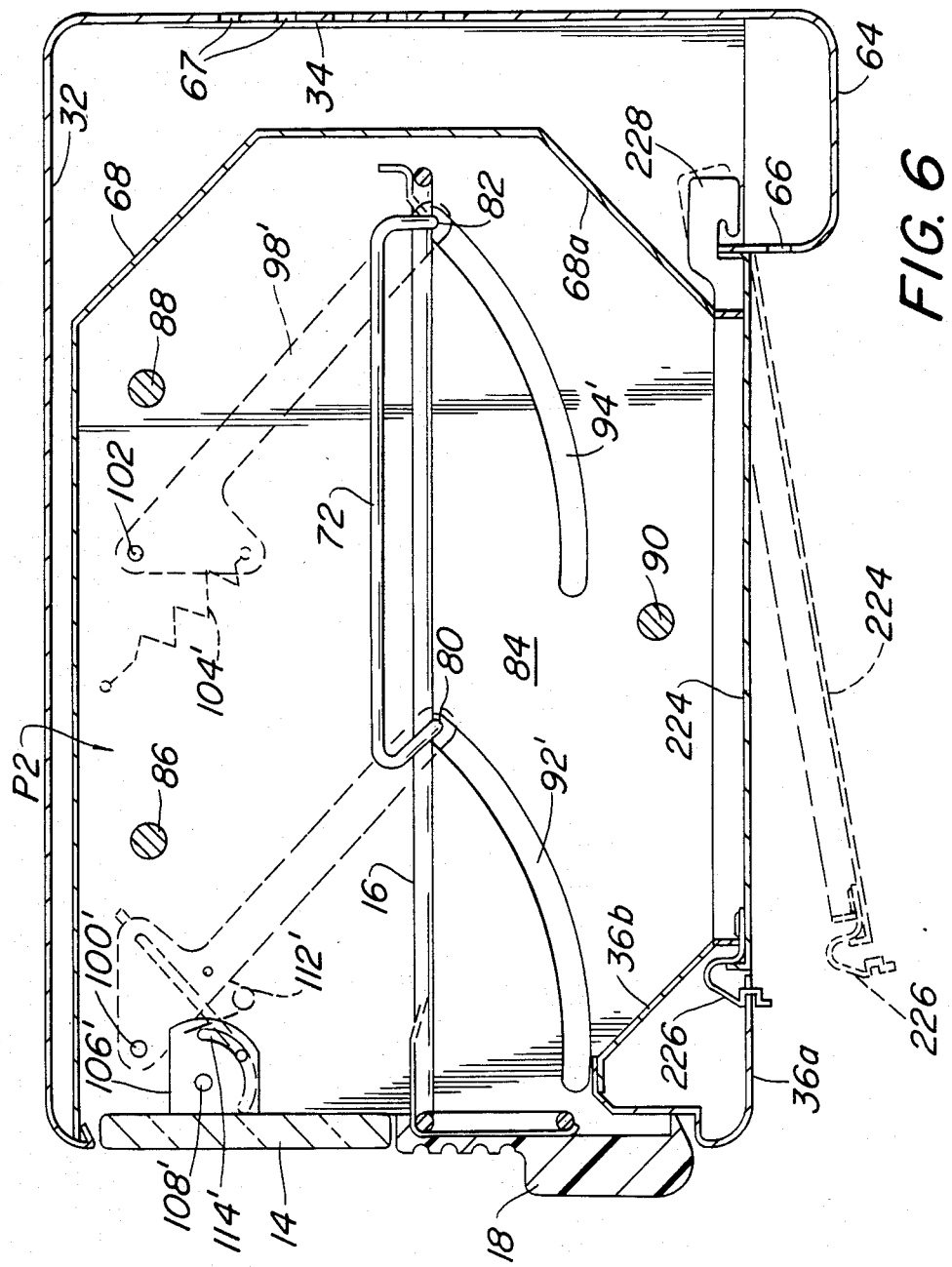
FIG. 6 is a section taken along 6—6 in FIG. 5 showing the parallelogram linkage and crumb tray.

The shelf or grill 16 is provided with a pair of side handles 72, 74 as best shown in FIG. 5. The ends 76, 78 of handle 74 protrude through openings in interior wall 40 toward side wall 30. The ends 80, 82 of handle 72 protrude through openings in interior wall 84 towards side wall 28. Grill handle 74 is connected via wall 40 to an associated parallelogram linkage P1 as shown in FIG. 3. Grill handle 72 is connected via wall 84 to an associated parallelogram linkage P2 as shown in FIG. 6. The parallelogram linkages P1 and P2 are identical. Accordingly, description of wall 40 and associated parallelogram linkage P1 shall suffice.

Figure 10:
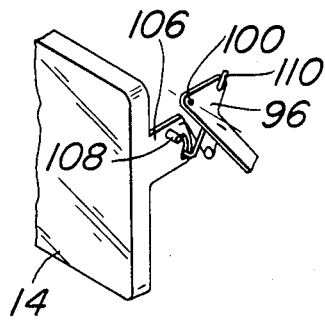
FIG. 10 is a perspective showing the coupling of the pivotable front door and a portion of the parallelagram linkage.

Wall 40 is provided with a pair of arcuate slots 92, 94. See FIG. 3. The ends 76, 78 of grill handle 74 extend through slots 92, 94. A link 96 is pivotably mounted on handle end 76. Another link 98 is pivotably mounted on handle end 78. Link 96 is pivotably mounted on a lug 100 which is part of or secured to wall 40. Link 98 is pivotably mounted on a lug 102 which is part of or secured to the wall. Link 98 is coupled to wall 40 by means of a spring 104. Link 96 is coupled by a connecting rod 110 to an ear 106 (shown in phantom in FIG. 3) which is part of door 14, via an arcuate slot 107 in wall 40. See FIGS. 3, 4 and 10. One end of connecting rod 110 extends through a hole in link 96. The other end of rod 110 extends through slot 107 in wall 40 and through a shorter arcuate slot 114 in ear 106. Ear 106 of door 14 is provided with a lug 108 which is mounted within an opening in wall 40. See FIGS. 3 and 4. Door 14 is also provided with an identical ear 106' adjacent wall 84. See FIG. 6. In this manner, door 14 is pivotably mounted on walls 40 and 84.

Link 96 is also coupled to ear 106 by means of a torsion spring 112. One end of torsion spring 112 extends through a hole in ear 106 above slot 114. See FIG. 4. The other end of the torsion spring extends through a hole in wall 40 and a hole in link 96. It can therefore be seen that as link 96 pivots clockwise about lug 100, connecting rod 110 seats in the lower extremity of slot 114 (FIG. 4) and urges door 14 clockwise with respect to the horizontal axis of lug 108. As link 96 and door 14 pivot clockwise together, torsion spring 112 is compressed. After an initial clockwise movement of door 14 the torsion spring is released, thereby urging door 14 to the open position shown in phantom in FIG. 3. Torsion spring 112 therefore acts as an "over the center" spring providing a spring assist to open door 14.

During transfer of the grill from the heating position to the delivery position, links 96, 98 pivot clockwise about pivots 100, 102 under assist of spring 104. The spring ensures that the links travel to or near the lower extremities of slots 92, 94. A dash pot 116 which is pivotably connected to wall 40 by means of a short rod (not shown) is coupled to link 98 by means of piston rod 118. Rod 118 extends through a hole provided at a medial position along link 98. As link 98 pivots clockwise about lug 102, it pulls rod 118 which yieldingly accomodates the clockwise pivotal motion of link 98.

Grill 16 is secured by screws or the like to panel 18. See FIGS. 4 and 6. The operator may therefore grasp panel 18 and push the panel forwardly so that the grill 16 is raised from the lower or delivery position shown in broken lines in FIG. 3 to the upper or heating position shown in phantom. During transfer of the grill from the delivery to the heating position, links 96, 98 pivot counterclockwise about pivots 100, 102 respectively.

When panel 18 is pushed forward to transfer grill 16 to the heating position, rod 110 seats in the upper extremity of slot 114 in door ear 106. Rod 110 pulls the ear so that door 14 pivots counterclockwise about the horizontal axis of lug 108, and torsion spring 112 compresses. Thus, counterclockwise pivotal movement of link 96 about lug 100 closes door 14 to the position shown in solid lines in FIG. 4. At the same time, link 98 stretches spring 104 and pushes piston rod 118 into dashpot 116. When links 96 and 98 move to the upper extremities of slots 92 and 94 respectively, grill 16 is in the upper or heating position and panel 18 is substantially flush with the toaster front as shown in FIG. 4.

Grill 16 is locked in the heating position, and panel 18 is therefore locked in the position shown in FIG. 4, by means of a releasable locking mechanism 120 best shown in FIGS. 4 and 5. Locking mechanism 120 comprises a latch bar 122 which is seated in a recess 124 in panel 18. See FIGS. 4 and 5. The latch bar is secured in recess 124 for limited pivotal movement by means of a spring 126. End 128 of the latch bar forms a dog which seats in an opening 130 in an upstanding front guard panel 36a. Spring 126 is wrapped around the other end 132 of the latch bar. The guard panel 36a is provided with an opening 134 adjacent latch end 132. The latch bar is operated by a lever 136 which is pivotably mounted on a lug 140 on partial bottom wall 36 as shown in FIG. 5. The lever serves as a release mechanism. A striker portion 138 of the lever displaces latch end 132 when the lever is pivoted counterclockwise about pivot 140. As shown in FIG. 4, striker 138 extends through opening 134 in guard panel 36a to contact latch end 132.

Figure 12:
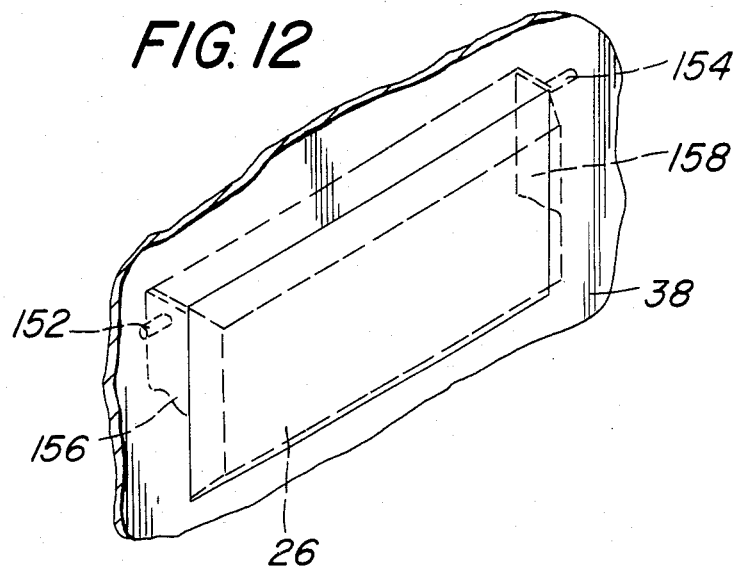
FIG. 12 is an enlargement of the "open" plate showing the pivot connection to the to toaster frame.

The lever 136 is coupled to partial bottom wall 36a by a spring 142 which is anchored to the lever between striker 138 and pivot 140. The lever is also coupled to a reciprocable plunger 144, which is part of a solenoid mechanism 146, by means of a spring 148. The end of the lever at which spring 148 is anchored is provided with an upstanding flange 150. As shown in FIG. 12, "open" plate 26 is provided with a pair of lugs 152, 154 which extend through openings in upstanding flanges 156, 158 formed in partial front wall 38. Plate 26 is therefore pivotable about a lateral axis at the elevation of lugs 152, 154. When plate 26 is depressed, it pivots and strikes the upstanding flange 150 on lever 136, producing counterclockwise motion of the lever about pivot 140. See FIG. 5. The counterclockwise motion of lever 136 compresses spring 148 without moving solenoid plunger 144. At the same time, striker 138 strikes latch end 132. See FIG. 4. Latch bar 122 therefore pivots forwardly against the return force of spring 126 so that latch dog 128 releases from opening 130 in guard panel 36a. This unlocks grill 16 from the heating position.

When latch dog 128 releases from guard panel opening 130, grill 16 drops by gravity from the heating position. Links 96, 98 pivot clockwise about lugs 100, 102 respectively under assist of spring 104, guiding grill 16 such that the grill moves forwardly while dropping to the delivery position shown in broken lines in FIG. 3. Movement of the grill is cushioned by dashpot 116. The dashpot ensures that the grill drops to the delivery position at a controlled uniform speed and prevents jarring of the toaster when the ends 76, 78 of grill handle 74 reach the lower extremities of slots 92, 94 respectively.

As grill 16 transfers from the heating position to the delivery position, front door 14 is pivoted upwardly so as to provide access to the grill. A food article on the grill can then be retrieved, and additional food articles may be placed on the grill for subsequent toasting. Grill 16 may then be transferred from the delivery position back to the heating position (FIG. 3) by pushing panel 18 towards the rear of the toaster. The grill is then guided by links 96, 98 rearwardly and upwardly towards the delivery position against the return force of spring 104 and the frictional resistance provided by dashpot 116. As the grill transfers to the heating position, spring 126 compresses and latch dog 128 contacts guard panel 36a. When grill 16 reaches the heating position, latch dog 128 drops into panel opening 130, thereby locking the grill in the heating position.

Figure 11:
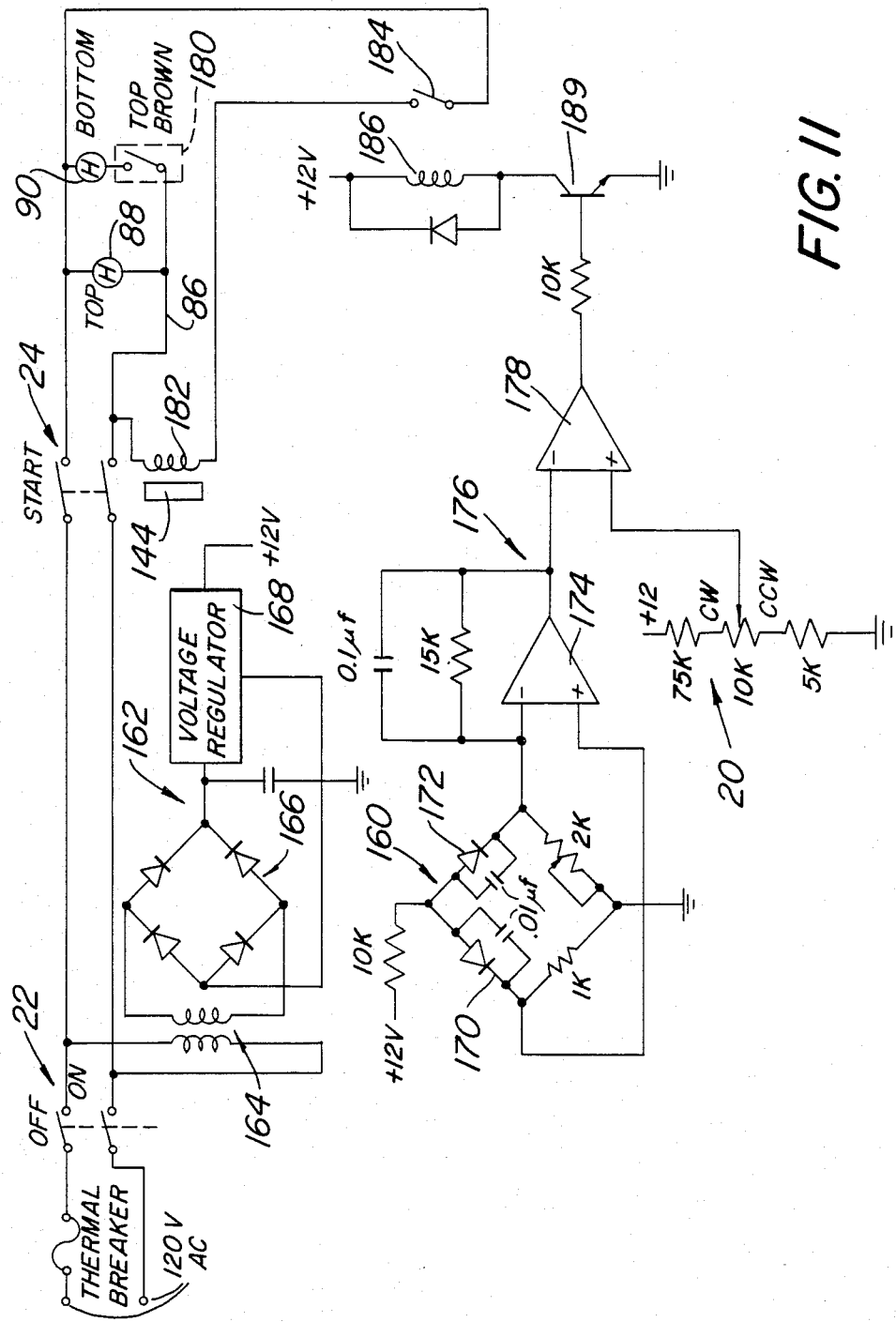
FIG. 11 is a diagram of the electronic control.

The lever 136 may also be automatically operated at the end of a toasting cycle by solenoid mechanism 146. The solenoid mechanism is part of the electronic control shown in FIG. 11. The electronic control includes a balance bridge 160 coupled to a +12 volt supply 162. Supply 162 is of a conventional design and includes a transformer 164, diode rectifier bridge 166 and a voltage regulator 168. Transformer 164 is connected across "on/off" switch 22, which is a double pole, single throw switch connected by plug leads to the a/c mains via a thermal breaker disposed at a suitable location within the toaster frame. Bridge 160 comprises two heat sensing diodes 170, 172 such as 1N4148 diodes. A fixed 1K resistor and a 2K potentiometer constitute the bridge arms opposite the diodes 170, 172. The bridge output is connected to the inverting (−) and non-inverting (+) inputs of an LM324 operational amplifier 174. Operational amplifier 174 is connected to a 0.1uf capacitor and 15K resistor so as to provide an amplifier 176 with a 0.015 second time constant. The output of the amplifier is connected to the inverting (−) input of another LM324 operational amplifier 178 which functions as a comparator. The non-inverting (+) input of the comparator is connected to the wiper of a 10K potentiometer which is mechanically operated by dial 20 mounted on toaster front wall 38. The ground side of the potentiometer is connected to a 5K resistor. The supply side of the potentiometer is connected to a 75K resistor. The 2K bridge potentiometer is preset to balance the bridge at the nominal "zero" voltage output corresponding to ambient temperature with no current flow through the heating elements 86, 88 and 90.

Figure 13:
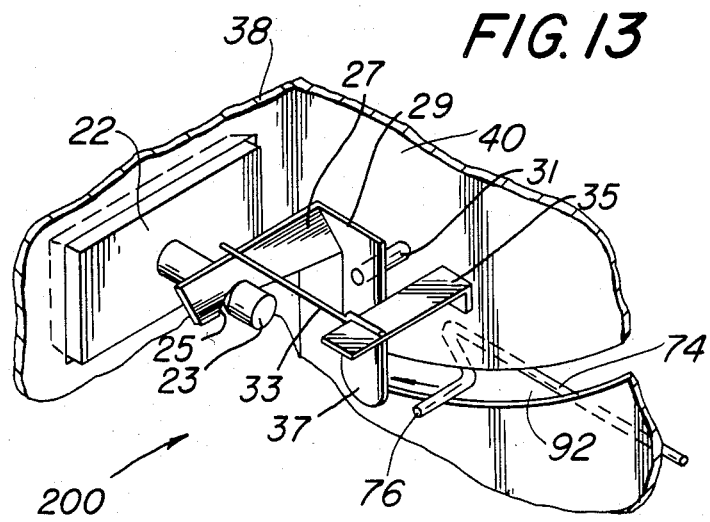
FIG. 13 is a perspective of a releasable locking mechanism for the "start" switch.

The bottom heating element 90 is connected in series with a single pole, single throw "top brown" switch 180 which is also mechanically operated by dial 20. Thus, when dial 20 is rotated to the extreme clockwise position, switch 180 is opened thereby breaking the current path to the bottom heating element. For all other settings of dial 20, switch 180 is closed so that the bottom heating element is connected in parallel with heating elements 86 and 88 which are series connected across the start switch 24. "Start" switch 24 is a double pole, single throw momentary contact switch which is mechanically latched by a mechanism 200 shown in FIG. 13 and described hereafter. A coil 182 and switch 184 are connected in series across the bottom heating element 90 and "top brown" switch 180. Coil 182 operates solenoid plunger 144 to release locking mechanism 120 as described hereafter.

The internal switch 184 is normally open and is closed by current flow through a coil 186 connected between the +12 volt supply and the collector of a MJE800 switching transistor 189. The emitter of the transistor is coupled to ground. The base of the transistor is coupled to the output of comparator 178 by means of a 10K resistor.

Initially, power is applied to the control by pressing the "on/off" switch 22 so as to close the switch. Assuming that a food article has been placed on grill 16, and that the grill is in the heating position with door 14 closed, dial 20 is rotated to the desired heat setting. If it is only desired to toast the top surface of the food article, dial 20 is rotated to the extreme clockwise position so as to open "top brown" switch 180. If it is desired to toast both sides of the food article, dial 20 is rotated to the desired heat setting, and "top brown" switch 180 remains closed. "Start" switch 24 is then depressed so as to close the switch and apply current to the heating elements 86, 88 and 90. The "start" switch is a commercially available spring urged momentary contact switch which is provided with a shaft 23. See FIG. 13. The shaft opens and closes the switch contacts which are located on a pc board (not shown). An annular groove 25 is provided in the shaft. When the switch is depressed, shaft 23 is displaced rearwardly, and the arm 27 of a pivotable latch 29 drops in the groove. Latch 29 is pivotably mounted on a lug 31 which is part of or secured to wall 40. A leaf spring 33 bears against the top edge of arm 27 so as to bias latch 29 in the counterclockwise direction about the horizontal axis of lug 31.

Spring 33 is secured at one end to a tab or arm 35 which is part of or secured to wall 40. When arm 27 drops in groove 25, it latches the "start" switch in the closed position thereby providing a current path to heating elements 86, 88, 90. See FIG. 11.

When the food article is heated by the heating elements, it emits IR radiation. The amount of IR radiation produced by the food article is proportional to the surface temperature of the food article and to the degree to which the article is toasted. As described hereafter, heat sensing diode 170 provides a resistance which varies with the ambient temperature within the toaster and the amount of IR radiation produced by the food article. Heat sensing diode 172 provides a resistance which varies only with ambient temperature within the toaster. The difference between the balance bridge voltage output lines therefore compensates for ambient temperature, and the output of amplifier 176 is therefore indicative of the actual degree of toasting of the food article. The output of the amplifier is compared to the voltage at the non-inverting (+) input of comparator 178 which input voltage is indicative of the heat setting, i.e., the desired degree of toasting of the food article. When the voltage output of amplifier 176 exceeds the voltage at the non-inverting (+) input of comparator 178, the comparator output turns transistor 189 on so as to provide a current path through coil 186 and to ground. Current flow through the coil closes internal switch 184 thereby providing current flow through coil 182. Current flow through coil 182 activates solenoid mechanism 146 so as to retract plunger 144 (FIG. 5). As the plunger retracts, it stretches spring 148 and causes lever 136 to rotate counterclockwise about pivot 140. Striker 138 strikes latch end 132, releasing latch bar 122 as previously explained. Grill 16 therefore transfers by gravity from the heating position to the delivery position under assist of spring 104, and link 96 pivots front door 14 upwardly so as to provide access to the toasted food article.

When grill 16 is near or at the delivery position, the end 76 of handle 74 strikes on arm 37 of the latch 29, thereby pivoting the latch clockwise about the horizontal axis of lug 31. See FIG. 13. Arm 27 therefore clears groove 25, releasing shaft 23. The shaft is urged by the switch spring (not shown) back to its initial position wherein the "start" switch is opened. This breaks the current path to heating elements 86, 88, 90. In addition, current ceases to flow through coil 182, and plunger 144 returns to its rest position. Spring 142 (FIG. 5) therefore returns lever 136 to its rest position. When current ceases to flow through heating elements 86, 88, 90, the temperature within the toaster interior begins to drop, as does the IR radiation produced by the food article. The resistances of diodes 170, 172 change accordingly, and the output of the bridge 160 drops. When the output of amplifier 176 drops below the voltage at the non-inverting (+) input of comparator 178, the comparator output turns transistor 189 off. Current therefore ceases to flow through coil 186, thereby opening internal switch 184. At this point, the control is completely reset and ready for the next toasting cycle or operation.

As previously indicated, diode 170 senses ambient temperature within the toaster as well as IR radiation produced by the food article while diode 172 senses only ambient temperature within the toaster. Diodes 170, 172 are mounted in a sensor assembly 188 as shown in FIGS. 3 and 9. Sensor assembly 188 comprises an inner tube 190 and an outer tube 192, both tubes being metallic (preferably stainless steel) and of square or approximately square cross section. Opposite walls 194, 196 of tube 192 are partially cut-out to form leaf springs 198, 200. The leaf springs are crimped so as to form detents 202, 204. The sensor assembly 188 is mounted in a square shaped cut-out formed in the lower oblique wall portion 68a of reflector 68. See FIGS. 3 and 5. The sensor assembly is disposed so that the beveled mouth of tube 190 faces grill 16 when the grill is in the heating position. IR radiation produced by a food article on the grill enters the mouth of tube 190 and travels through the tube interior where it is sensed by diode 170. Preferably, diode 170 is attached to a small blackened metallic plate 203 as shown in FIG. 9. Plate 203 may, for example, be square-shaped and 5 mm×5 mm. The IR radiation is absorbed by plate 203 and transmitted directly to diode 170. Diode 172 is mounted below diode 170 and senses ambient temperature.

The space between tubes 190 and 192 is utilized as an air circulation channel. The tube 190 extends through a (phenolic) pc board 205 and is secured in position by means of adhesive. The bottom portion of tube 190 is cut-out to provide a passageway for the diode leads. The diodes 170, 172 are mounted on opposite sides of pc board 205 within inner tube 190. The bottom end of the inner tube is covered by a cap. The outer tube 194 is provided with legs which are secured to the pc board. The bottom end of the outer tube is open. Air flows through the space between the inner and outer tubes so as to prevent the sensor assembly from overheating.

Figure 7:
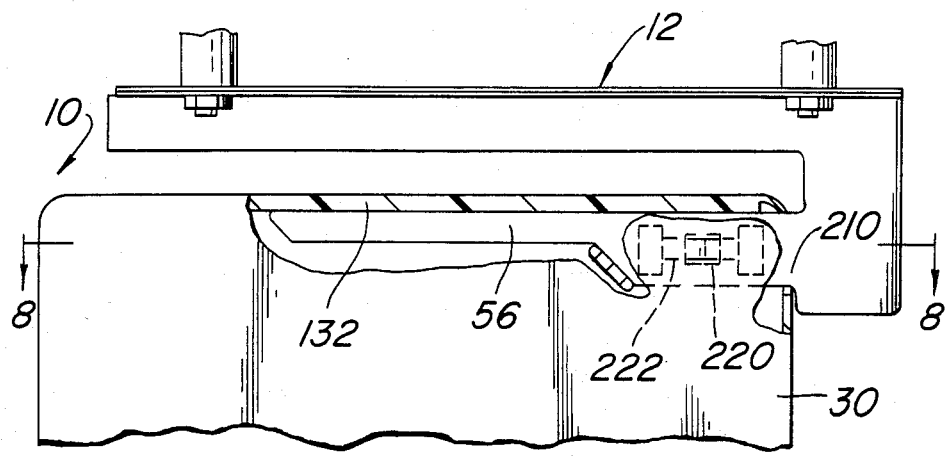
FIG. 7 is a partial elevation and section showing the mating structure of the toaster frame and overhead support mechanism.
Figure 8:
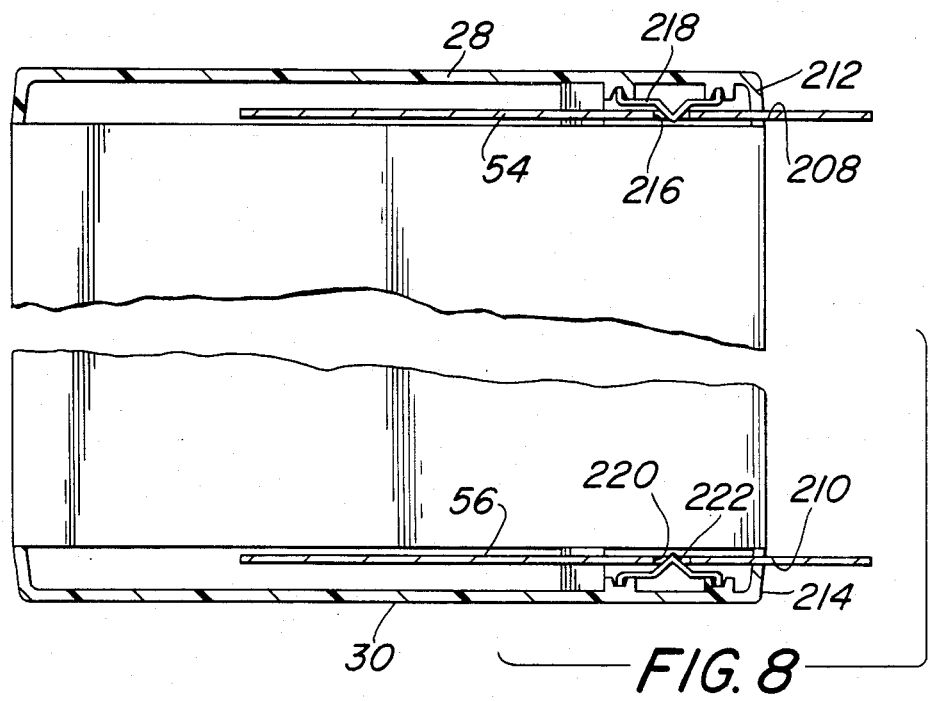
FIG. 8 is a plan section taken along 8—8 in FIG. 7.

Referring to FIGS. 7 and 8, there is shown in greater detail the interconnection of the overhead support mechanism 12 and the toaster 10. The bayonet arms 54, 56 of the overhead support mechanism are inserted through a pair of openings 208, 210 formed in the rear portions 212, 214 of side walls 28, 30 respectively. Bayonet arm 54 is provided with a rectangular shaped opening 216 which serves as a detent for a V-clip 218 mounted on side wall 28. Bayonet arm 56 is provided with a square shaped opening 220 which serves as a detent for a V-clip 222 mounted on side wall 30.

To suspend the toaster from the underside of a cabinet, the overhead support mechanism 12 is secured to the cabinet underside by bolts or the like. The toaster 10 is then releasably secured to the overhead support mechanism by sliding the toaster rearwardly over the bayonet arms 54, 56 such that the V-clips 218, 222 snap into the bayonet arm openings 216, 220 respectively, thereby securing the toaster to the bayonet arms below the cabinet underside. To remove the toaster from the overhead support mechanism, the toaster is pulled forwardly such that the bayonet arms depress V-clips 218, 222. This releases the toaster. The operator can then slide the toaster off the bayonet arms.

The bottom of the toaster to the left of partial bottom wall 36 is formed by a crumb tray 224. See FIGS. 1 and 6. The crumb tray is provided with a spring clip 226 which snap fastens over the bottom edge of guard panel 36a to secure the crumb tray in the horizontal position. The crumb tray is provided with a pair of rearwardly extending catches 228 (only one of which is shown in FIG. 6). The catches 228 extend over the top edge of the forwardmost portion of rear wall bight section 64 behind the lower oblique wall 68a of reflector 68. To remove the crumb tray, spring clip 226 is grasped from the underside of the toaster and squeezed so as to release the tray from the front guard panel 36a. The tray drops by gravity to the position shown in phantom in FIG. 6.

The rear of the tray is then raised by the operator so that catches 228 clear the top edge of bight section 64 of wall 34. The operator can then pull the tray forwardly so as to clear the underside of the toaster.

The present invention may be embodied in other specific forms without departing from the spirit or essential attributes thereof and, accordingly, reference should be made to the appended claims, rather than to the foregoing specification, as indicating the scope of the invention.

We claim

1. Toaster, comprising:
   (a) a frame,
   (b) a shelf for supporting a food article mounted on the frame so as to be moveable between a first horizontal heating position and a second horizontal delivery position forward and below the heating position, the shelf maintaining a horizontal position while moving through the heating and delivery positions,
   (c) heater means disposed within the frame for heating a food article,
   (d) means disposed within the frame for sensing IR radiated by the food article, sensing the ambient temperature within the frame and compensating for the ambient temperature so as to provide an output signal that is indicative of the actual surface temperature of the food article,
   (e) means for activating said heater means,
   (f) means coupled to receive said output signal for de-activating said heater means when the surface temperature of the food article exceeds a preselected threshold,
   (g) overhead support means adapted to be secured to and below a supporting surface, and
   (h) mating structure on said overhead support means and said frame for securing said frame to said overhead support means below said supporting surface.

2. Toaster according to claim 1 including linkage means coupled to the shelf for transferring the shelf by gravity from said heating position to said delivery position.

3. Toaster according to claim 2 including a door pivotably mounted on said frame, said linkage means being coupled to said door so as to pivot said door between closed and open positions while transferring said grill from said heating position to said delivery position.

4. Toaster, comprising:
   (a) first means for heating a food article,
   (b) second means for electronically sensing both the surface temperature of the food article and the ambient temperature within the toaster,
   (c) third means for electronically sensing only the ambient temperature within the toaster,
   (d) fourth means responsive to the second and third means for electronically providing an indication of the actual surface temperature of the food article, and
   (e) fifth means for electronically controlling the first means based on the indication of the surface temperature of the food article provided by the fourth means.

5. Toaster according to claim 4 wherein said means for sensing surface temperature includes means for sensing IR radiation emitted by the surface of the food article, and wherein said means for sensing ambient temperature includes means for sensing ambient IR radiation.

* * * * *